(12) United States Patent
Yoon

(10) Patent No.: US 11,644,205 B2
(45) Date of Patent: May 9, 2023

(54) SMOKE CONTROL SYSTEM OF BUILDING AND METHOD FOR CONSTRUCTING THE SAME

(71) Applicant: Sung Hwan Yoon, Seoul (KR)

(72) Inventor: Sung Hwan Yoon, Seoul (KR)

( * ) Notice: Subject to any disclaimer, the term of this patent is extended or adjusted under 35 U.S.C. 154(b) by 0 days.

(21) Appl. No.: 17/946,801

(22) Filed: Sep. 16, 2022

(65) Prior Publication Data

US 2023/0089323 A1 Mar. 23, 2023

(30) Foreign Application Priority Data

Sep. 23, 2021 (KR) .................. 10-2021-0125527

(51) Int. Cl.
*F24F 11/33* (2018.01)
*F24F 11/74* (2018.01)
*F24F 11/00* (2018.01)

(52) U.S. Cl.
CPC .......... *F24F 11/33* (2018.01); *F24F 11/0001* (2013.01); *F24F 11/74* (2018.01)

(58) Field of Classification Search
CPC .......... F24F 11/33; F24F 11/34; F24F 11/0001
See application file for complete search history.

(56) References Cited

U.S. PATENT DOCUMENTS

| 3,884,133 A | * | 5/1975 | Miller | A62C 2/06 165/250 |
| 4,047,571 A | * | 9/1977 | Chaintrier | A62C 5/002 169/15 |
| 4,058,253 A | * | 11/1977 | Munk | F24F 11/0001 169/61 |
| 4,765,231 A | * | 8/1988 | Aniello | F24F 11/0001 454/239 |

(Continued)

FOREIGN PATENT DOCUMENTS

| CN | 111609508 A | * | 9/2020 |
| KR | 100421805 B1 | * | 3/2004 |

(Continued)

OTHER PUBLICATIONS

Original Register of Patent dated Sep. 23, 2021, in corresponding to Korean Application No. 10-2021-0125527; 2 pages (with English Translation).

(Continued)

*Primary Examiner* — Nelson J Nieves
(74) *Attorney, Agent, or Firm* — Novick, Kim & Lee PLLC; Byungwoong Park

(57) ABSTRACT

A smoke control system of a building including a supply air duct installed in an interior of the building having a plurality of floors in a vertical direction, including a plurality of openings corresponding to the plurality of floors, respectively, and one end of which is exposed to an outside of the building, a blower that supplies air to the supply air duct, and (Continued)

a plurality of automatic differential pressure dampers installed in a plurality of ancillary rooms provided on the plurality of floors, respectively, to be adjacent to the plurality of openings. Opening areas of the plurality of openings increase as locations of the plurality of openings become farther away from a point, at which air is supplied to the supply air duct by the blower.

5 Claims, 7 Drawing Sheets

(56) References Cited

U.S. PATENT DOCUMENTS

| | | | | |
|---|---|---|---|---|
| 5,178,581 | A * | 1/1993 | Del Monte | F24F 7/08 454/239 |
| 5,788,571 | A * | 8/1998 | Ivison | F24F 7/06 454/252 |
| 9,784,466 | B2 * | 10/2017 | Kim | F24F 11/30 |
| 2016/0084513 | A1 * | 3/2016 | Lee | A62C 2/242 454/328 |

FOREIGN PATENT DOCUMENTS

| | | | |
|---|---|---|---|
| KR | 100421806 B1 | * | 3/2004 |
| KR | 200393245 Y1 | * | 8/2005 |
| KR | 200432485 Y1 | * | 12/2006 |
| KR | 20130006253 U | * | 10/2013 |
| KR | 200474019 Y1 | * | 8/2014 |
| KR | 20170088537 A | * | 8/2017 |
| KR | 20180028297 A | * | 3/2018 |
| KR | 10-2054889 B1 | | 12/2019 |
| KR | 102054889 B1 | * | 12/2019 |
| KR | 10-2273625 B1 | | 7/2021 |
| KR | 10-2398031 B1 | | 5/2022 |

OTHER PUBLICATIONS

Office Action dated Dec. 9, 2021, in corresponding to Korean Application No. 10-2021-0125527; 10 pages (with English Translation).

Notice of Allowance dated Apr. 26, 2022, in corresponding to Korean Application No. 10-2021-0125527; 6 pages (with English Translation).

* cited by examiner

<Assumption>

Number of floors in building = Twenty five floors

Flow rate of blower Q = 14.4 / 25 = 0.576m³/s

Static pressure of discharge side of blower = 550Pa

Area of differential pressure damper = 0.87 x 0.42 = 0.3654m³

| floor | Pressure (Pa) | Flow velocity (m/s) | Opening area(Width x Height)(m²) | Ratio(%) |
|---|---|---|---|---|
| 25th floor | 50 | 9.1 | 0.3654 (0.42 × 0.87) | 100 |
| 20th floor | 150 | 15.7 | 0.2142 (0.42 × 0.51) | 59 |
| 15th floor | 250 | 20.3 | 0.1638 (0.42 × 0.39) | 45 |
| 10th floor | 350 | 24.0 | 0.1386 (0.42 × 0.33) | 38 |
| 5th floor | 450 | 27.2 | 0.1218 (0.42 × 0.29) | 33 |
| 1st basement floor | 550 | 30.1 | 0.1092 (0.42 × 0.26) | 30 |

SMOKE CONTROL SYSTEM OF BUILDING AND METHOD FOR CONSTRUCTING THE SAME

CROSS-REFERENCE TO RELATED APPLICATIONS

A claim for priority under 35 U.S.C. § 119 is made to Korean Patent Application No. 10-2021-0125527 filed on Sep. 23, 2021, in the Korean Intellectual Property Office, the entire contents of which are hereby incorporated by reference.

BACKGROUND

Embodiments disclosed in the inventive concept relate to a smoke control system that is constructed to maintain differential pressures and smoke-proof wind speeds between living rooms and ancillary rooms in a building.

An ancillary room smoke control system installed in ancillary rooms of a building refers to a facility for constantly maintaining differential pressures between ancillary rooms and living rooms to prevent a phenomenon, in which toxic gases due to a fire are introduced from the living rooms to the ancillary rooms when the fire occurs in a building. The ancillary room smoke control system may prevent a phenomenon, in which toxic gases generated in a living room are discharged to an ancillary room, by maintaining a pressure of the ancillary room at a pressure that is higher than that of the living room. It may be difficult to evacuate persons indoors through a door as a pressure is applied to a door of a living room when a pressure of an ancillary room is excessively higher than a pressure of the living groom (an overpressure operation), and thus the smoke control system needs to maintain a suitable differential pressure. The suitable differential pressure between the living room and the ancillary room, for example, may be about 40 Pa.

A general ancillary room smoke control system may employ a complex damper that adjusts an open degree of a discharge duct of a blower or an inverter scheme of adjusting an amount of wind by controlling an rpm of the blower, to adjust a differential pressure.

SUMMARY

When the differential pressure is adjusted by using the complex damper in the smoke control system, it is not easy to adjust the amount of wind and it is difficult to basically solve an overpressure problem. Meanwhile, when the differential pressure is adjusted by using the inverter, a range for adjustment of the amount of the wind is narrow, and it is also difficult to basically solve the overpressure problem similarly. Accordingly, a smoke control system that may generate uniform differential pressure in ancillary rooms of the building, and a method for constructing the smoke control system may be required.

Embodiments of the inventive concept provide a smoke control system that is designed to uniformly distribute flow rates of air in ancillary rooms provided in respective floors of a building, and a method for constructing the smoke control system.

A smoke control system of a building according to an embodiment disclosed in the inventive concept includes a supply air duct installed in an interior of the building having a plurality of floors in a vertical direction, including a plurality of openings corresponding to the plurality of floors, respectively, and one end of which is exposed to an outside of the building, a blower that supplies air to the supply air duct, and a plurality of automatic differential pressure dampers installed in a plurality of ancillary rooms provided on the plurality of floors, respectively, to be adjacent to the plurality of openings, and opening areas of the plurality of openings increase as locations of the plurality of openings become farther away from a point, at which air is supplied to the supply air duct by the blower.

According to an embodiment, the smoke control system may further include a gravitational system flap damper installed at one end of the supply air duct, and operated by an internal pressure of the supply air duct.

According to an embodiment, the opening areas of the plurality of openings are determined to generate uniform differential pressures in the plurality of ancillary rooms by uniformly distributing the flow rates of the air in the plurality of openings.

According to an embodiment, the opening areas of the plurality of openings may be determined based on a flow rate of the air generated by the blower, the number of the plurality of floors, and pressures in the plurality of openings, and maximum values of the opening areas of the plurality of openings may correspond to occupied areas of the plurality of automatic differential pressure dampers.

A method for constructing a smoke control system of a building according to an embodiment of the inventive concept includes designing a blower that supplies air to a supply air duct installed in an interior of the building having a plurality of floors in a vertical direction, based on a leakage flow rate and a supplementation flow rate of the air generated in a plurality of ancillary rooms included in the building, measuring a flow rate of the air generated by the blower, calculating, to form a plurality of openings corresponding to the plurality of floors in the supply air duct, opening areas of the plurality of openings such that the opening areas increase as locations of the plurality of openings become farther away from a point, at which the air is supplied to the supply air duct by the blower, based on the flow rate of the air generated by the blower, the number of plurality of floors, pressures in the plurality of openings, and occupied areas of a plurality of automatic differential pressure dampers installed to be adjacent to the plurality of openings, respectively, forming the plurality of openings in the supply air duct depending on the calculated opening areas, testing differential pressures and smoke-proof wind speeds generated in the plurality of ancillary rooms, respectively, and adjusting the opening areas of the plurality of openings based on a result of the testing.

A smoke control system of a building according to an embodiment of the inventive concept includes a supply air duct installed in an interior of the building having a plurality of floors in a vertical direction, including a plurality of communication passages corresponding to the plurality of floors, respectively, and one end of which is exposed to an outside of the building, a blower that supplies air to the supply air duct, a plurality of automatic differential pressure dampers installed to be adjacent to the plurality of communication passages, respectively, in a plurality of ancillary rooms provided in the plurality of floors, respectively, and a plurality of opening area adjusting members located between the plurality of communication passages and the plurality of automatic differential pressure dampers, and each having a plate shape including an opening, and opening areas of the plurality of openings included in the plurality of opening area adjusting members, respectively, increase as locations of the plurality of openings become farther away from a point, at which air is supplied to the supply air duct by the blower.

A method for constructing a smoke control system of a building according to an embodiment of the inventive concept includes designing a blower that supplies air to a supply air duct installed in an interior of a building having a plurality of floors in a vertical direction, based on a leakage flow rate and a supplementation flow rate of the air generated in a plurality of ancillary rooms included in the building, measuring a flow rate of the air generated by the blower, calculating, to determine opening areas of a plurality of openings formed in a plurality of opening area adjusting member, respectively, which are located between a plurality of communication passages corresponding to a plurality of floors included in the supply air duct, and a plurality of differential pressure dampers installed to be adjacent to the plurality of communication passages, respectively, the opening areas of the plurality of openings such that the opening areas increase as locations of the plurality of openings become farther away from a point, at which the air is supplied to the supply air duct by the blower, based on a flow rate of the air generated by the blower, the number of the plurality of floors, pressures in the plurality of communication passages, and occupied areas of a plurality of automatic differential pressure dampers, installing the plurality of opening area adjusting members and the plurality of differential pressure dampers corresponding to the calculated opening areas in the plurality of communication passages, testing differential pressures generated in the plurality of ancillary rooms, respectively, and adjusting the opening areas of the plurality of openings, respectively, based on a test result.

BRIEF DESCRIPTION OF THE FIGURES

The above and other objects and features will become apparent from the following description with reference to the following figures, wherein like reference numerals refer to like parts throughout the various figures unless otherwise specified, and wherein.

With regard to description of drawings, the same or similar components may be marked by the same or similar reference numerals.

DETAILED DESCRIPTION

Figure 1:
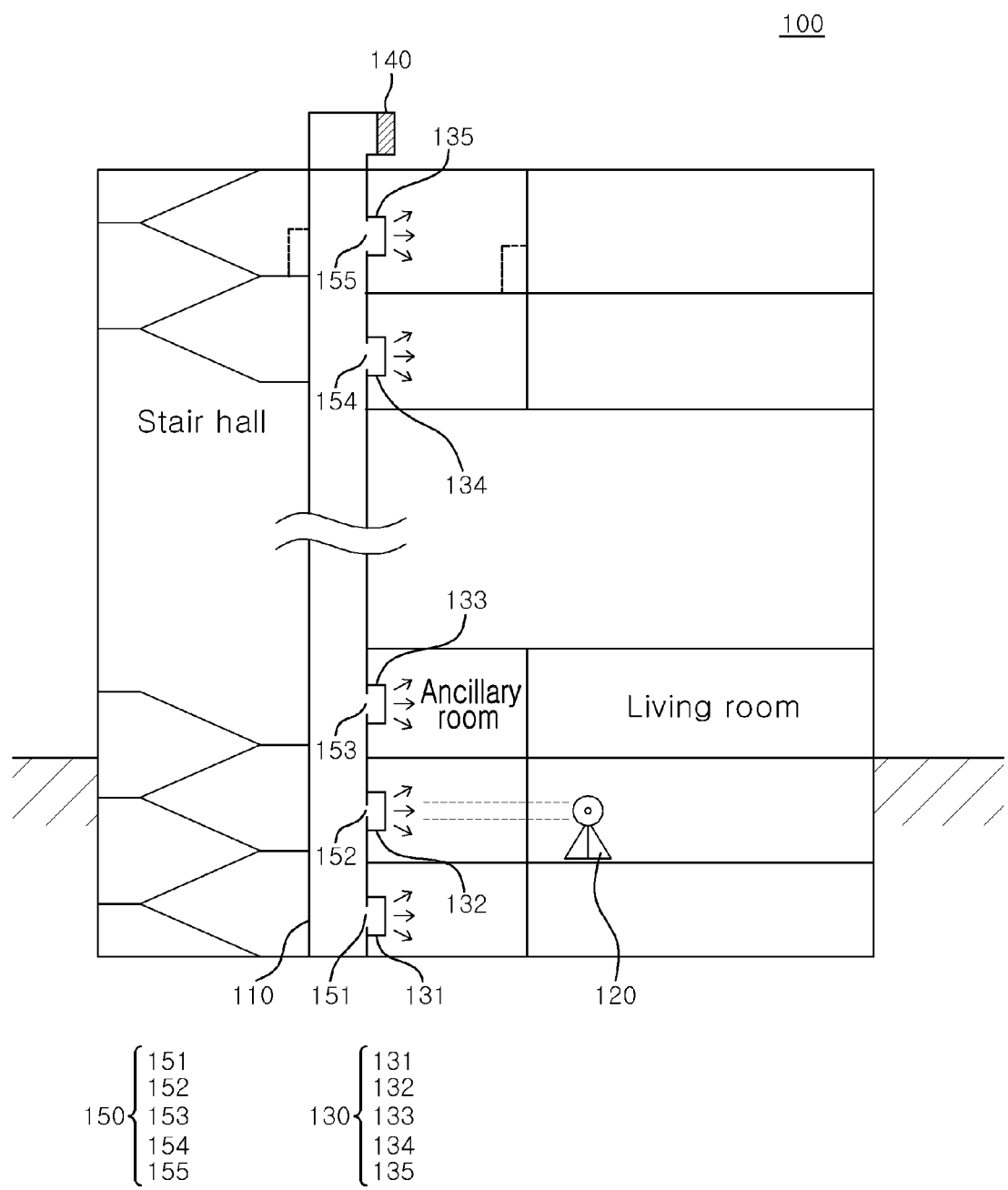
FIG. 1 is an elevation view of a building illustrating a whole structure of a smoke control system of a building according to an embodiment.

Hereinafter, some embodiments of the inventive concept will be described in detail through exemplary drawings. However, the embodiments according to the inventive concept are not intended to limit the specific embodied forms, and it should be understood that the present inventive concept includes various changes, equivalents, and replacements of the embodiments of the inventive concept. Throughout the specification, it is noted that the same or like reference numerals denote the same or like components even though they are provided in different drawings. Further, in the following description of the inventive concept, a detailed description of known functions and configurations incorporated herein will be omitted when it may make the subject matter of the inventive concept rather unclear.

FIG. 1 is an elevation view of a building illustrating a whole structure of a smoke control system of a building according to an embodiment.

Referring to FIG. 1, a smoke control system 100 of a building according to an embodiment may be installed in an interior of the building. The building is a building having a plurality of floors each including a stair hall, an ancillary room (or an evacuation zone), and a living room (an interior space connected to the ancillary room), and for example, may be an apartment house. The smoke control system 100 of the building may include a supply air duct 110, a blower 120, a plurality of automatic differential pressure dampers 130, and a system flap damper 140.

The supply air duct 110 may be installed in an interior of the building having the plurality of floors in a vertical direction. The supply air duct 110 may be a conduit, in which air is communicated. The supply air duct 110 may be located to be adjacent to ancillary rooms provided in the floors of the building, respectively. The supply air duct 110 may include a plurality of openings 150 corresponding to the plurality of floors of the building, respectively. The plurality of openings 150 may be communicated with the plurality of ancillary rooms provided in the plurality of floors, respectively, through the plurality of automatic differential pressure dampers 130, respectively. For example, a fifth opening 155 may be located to be adjacent to the ancillary room on the uppermost floor, and may be communicated through a fifth automatic differential pressure damper 135. One end of the supply air duct 110 may be exposed to an outside of the building.

The blower 120 may supply air to the supply air duct 110. The blower 120, for example, may be installed on the first basement floor of the building as illustrated in FIG. 1, and may be installed on another floor if necessary. It may be designed such that a flow rate of the air supplied to the supply air duct 110 by the blower 120 corresponds to a sum of a leakage flow rate and a supplementation flow rate of the air in the ancillary room. The leakage flow rate may mean a flow rate of the air leaked from all of the ancillary room in a state, in which doors of a living room and a stair hall are closed. The supplementation flow rate may mean a flow rate of the air leaked when the door of the living room is opened (the number of opened doors is set differently depending on the number of the floors of the building). Differential pressures in the ancillary rooms and the living rooms may be maintained by the air supplied by the blower 120.

The plurality of automatic differential pressure dampers 130 may be installed in the plurality of ancillary rooms, respectively, to be adjacent to the plurality of openings 150. Each of the automatic differential pressure dampers 130 may include a sleeve, a louver, a damper, a motor, a differential pressure sensor, and a control panel. The automatic differential pressure damper 130 may supply the air supplied through the plurality of openings 150 to the ancillary room by opening and closing the damper depending on a differential pressure detected by the differential pressure sensor.

The system flap damper 140 may be installed at one end of the supply air duct 110. The system flap damper 140 may be operated in a gravitational way by an internal pressure of the supply air duct 110. The system flap damper 140 may be closed immediately when the door of the living room or the door of the stair hall is opened, and thus the air of the supplementation flow rate may be supplied to the ancillary room. The system flap damper 140 may prevent generation of an overpressure by discharging the air of the supplementation flow rate and the air of a marginal leakage flow rate when both of the door of the living room and the door of the stair hall are closed, and surging may be prevented due to a rated operation of the blower 120.

The opening areas of the plurality of openings 150 formed in the supply air duct 110 may be different. For example, the opening areas of the plurality of openings 150 may increase as locations of the plurality of openings 150 become farther away from a point, at which the air is supplied to the supply air duct 110 by the blower 120. The opening areas of the plurality of openings 150 may be formed to generate uniform differential pressures in the plurality of ancillary rooms by uniformly distributing flow rates of the air in the plurality of openings 150. Pressures (e.g., static pressures) in the plurality of openings 150 may decrease as the openings 150 become farther away from the blower 120, and accordingly, flow velocities of the air in the plurality of openings 150 may decrease as the openings 150 become farther away from the blower 120. For example, the opening areas of the first opening 151 and the third opening 153 may be larger than the opening area of the second opening 152, the opening area of the fourth opening 154 may be larger than the opening area of the third opening 153, and the opening area of the fifth opening 155 may be larger than the opening area of the fourth opening 154. As the opening areas become larger as the openings 150 become farther away from the blower 120, the flow rates of the air may be distributed uniformly.

According to an embodiment, the opening areas of the plurality of openings 150 may be determined based on the flow rate of the air generated by the blower 120, the number of the plurality of floors, and the pressures in the plurality of openings 150. Maximum values of the opening areas of the plurality of openings 150 may correspond to occupied areas of the plurality of automatic differential pressure dampers 130. A detailed method for determining the opening areas will be described in detail with reference to FIG. 3.

Figure 2:
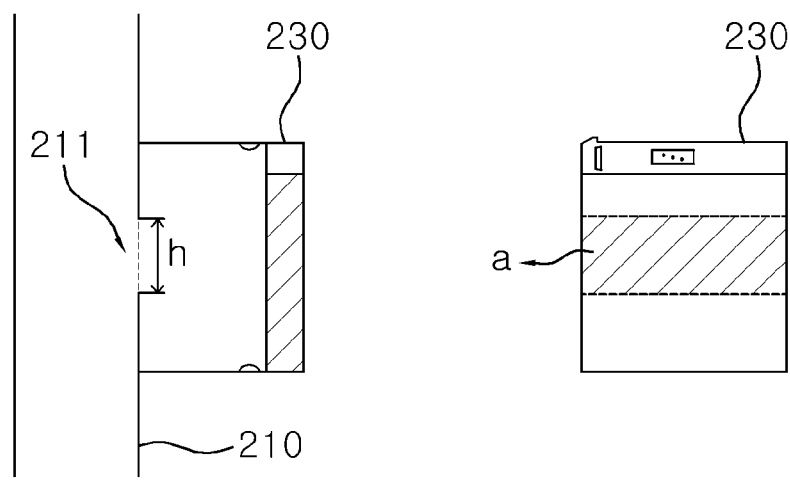
FIG. 2 illustrates a supply air duct included in a smoke control system of a building, and openings and automatic differential pressure dampers formed in the supply air duct according to an embodiment.

FIG. 2 illustrates a supply air duct included in a smoke control system of a building, and openings and automatic differential pressure dampers formed in the supply air duct according to an embodiment.

Referring to FIG. 2, the smoke control system according to an embodiment may include a supply air duct 210, openings 211, and automatic differential pressure dampers 230.

The air supplied by the blower may be supplied to the supply air duct 210. The air supplied to the supply air duct 210 may be supplied to the ancillary room through the openings 211 and the automatic differential pressure dampers 230 to maintain differential pressures. Flow velocities of the air that passes through the openings 211 may be different depending on the floors, on which the openings 211 are located. A constant flow rate of air may be generated by adjusting heights "h" of the openings depending on pressures (e.g., static pressures) in the openings 211 (widths of the openings 211 may be fixed). The automatic differential pressure dampers 230 may detect differential pressures of the ancillary rooms and living rooms, and may supply the air supplied through the openings 211 to the ancillary rooms by opening the dampers when the differential pressures are lower than a target value (e.g., 40 Pa), and may cut off supply of the air to the ancillary rooms by closing the damper when the differential pressures are higher than a target value (e.g., 60 Pa). The opening areas "a" of the openings 211 may be not more than an area of the automatic differential pressure dampers 230.

Figure 3:
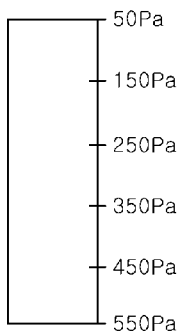
FIG. 3 is a view illustrating a scheme for calculating opening areas of a plurality of openings formed in a supply air duct included in a smoke control system of a building according to an embodiment.

FIG. 3 is a view illustrating a scheme for calculating the opening areas of the plurality of openings formed in the supply air duct included in the smoke control system of the building according to an embodiment.

Referring to FIG. 3, the plurality of openings may be formed in the supply air duct included in the smoke control system of the building according to an embodiment. In FIG. 3, the opening areas of, among the plurality of openings, the openings corresponding to some floors will be described exemplarily for convenience of description. Here, it is assumed that the number of floors of the building is twenty five, the blower is installed on the first basement floor of the building, a discharge pressure (e.g., a static pressure) of the blower is 550 Pa, and areas of the automatic differential pressure dampers are 0.3654 $m^2$ (in case of 0.42×0.87). The flow rates of the air in the plurality of openings may correspond to values obtained by dividing the flow rate of the air by the blower by the numbers of the floors.

In the first basement floor, on which the blower is installed, the pressure (e.g., the static pressure on the discharge side) may be 550 Pa. The pressures in the openings of the respective floors may become lower as the openings become farther away from the opening of the first basement floor. The pressures in the openings of the floors may be directly measured values. The pressure values described in FIG. 3 are arbitrarily described for convenience of description, and may be different from actually measured values. The differential pressures of the ancillary rooms preferably have to be maintained at 40 Pa, and to achieve this, the pressure in the opening of the twenty fifth floor that is the uppermost floor of the building may be required to be at least 50 Pa.

The flow velocities of the air in the openings of the respective floors may be calculated based on the pressures. The flow velocities of the air in the openings of higher pressures may be higher than the flow velocities of the air in the openings of lower pressures.

The opening areas may be calculated such that the flow rates of the air in the openings of the respective floors may be maintained constantly. Because the flow rates of the air are calculated by a product of the flow velocities and the opening areas, the opening areas of the openings of lower flow velocities may be calculated to be higher and the opening areas of the openings of higher flow velocities may be calculated to be lower. The maximum values of the opening areas may correspond to areas (e.g., 0.3654 $m^2$) of the automatic differential pressure dampers. When the opening area of the highest opening of the lowest flow velocity is set to be the same as the area of the automatic differential pressure damper, the opening areas of the openings of the other floors may be calculated such that the product of the flow velocity of the air in the opening of another floor and the opening area is the same as the product of the flow velocity of the air in the highest opening and the opening area. The widths of the respective floors may be set to the same value (e.g., 0.42 m (corresponding to the width of the automatic differential pressure damper)), and the heights of the openings of the floors may be calculated to correspond to the opening areas of the respective openings.

When it is assumed that the opening area of the opening on the twenty fifth floor is 100%, the opening area of the opening on the twentieth floor is 59%, the opening area of the opening on the fifteenth floor is 45%, the opening area of the opening on the tenth floor is 38%, the opening area of the opening on the fifth floor is 33%, and the opening area of the opening on the first basement floor is 30%.

As described above, the flow rates of the air in the plurality of openings may be maintained uniformly by determining the opening areas of the plurality of openings.

Figure 4:
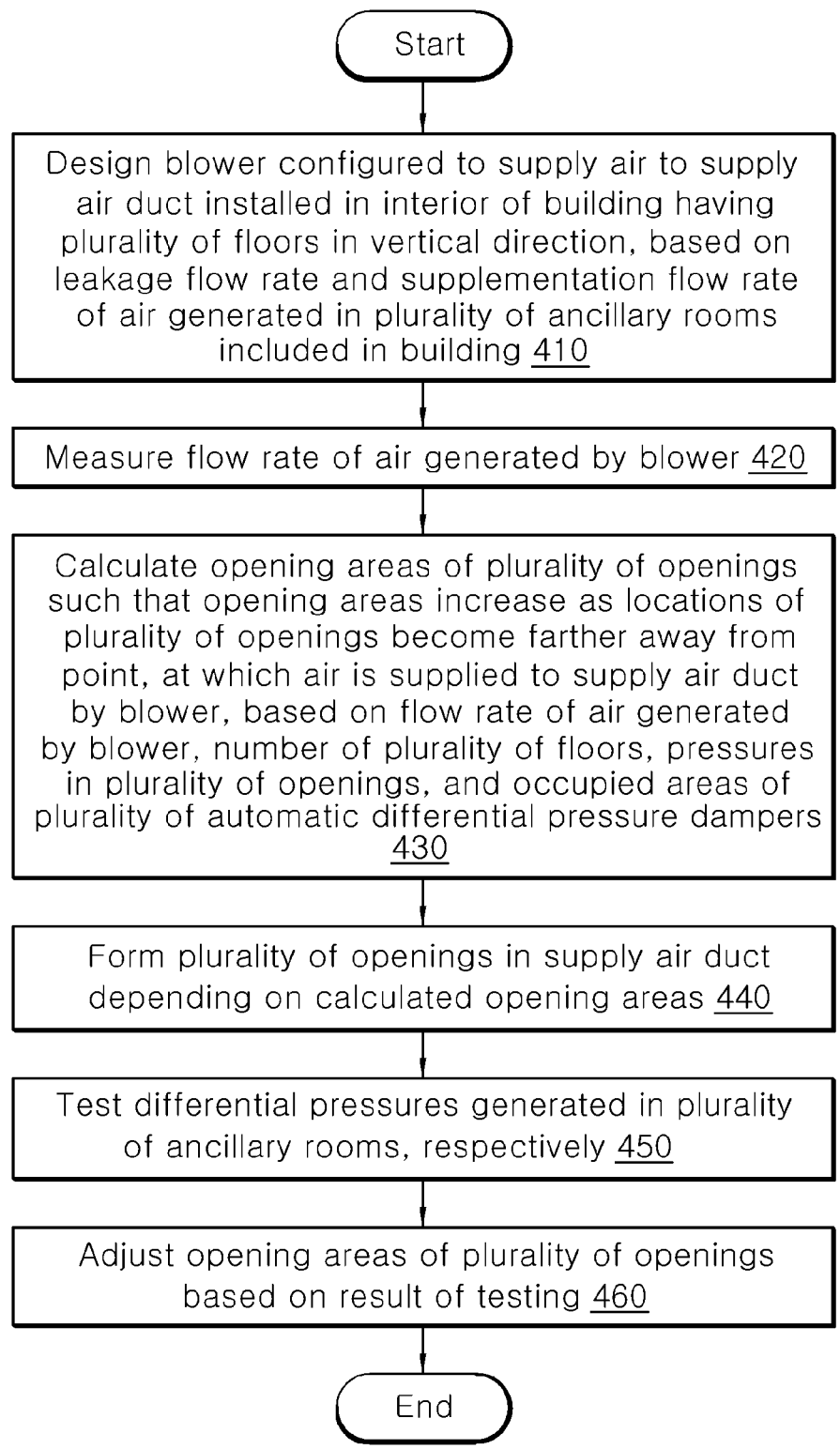
FIG. 4 is a flowchart illustrating a method for constructing a smoke control system of a building according to an embodiment.

FIG. 4 is a flowchart illustrating a method for constructing the smoke control system of a building according to an embodiment.

Referring to FIG. 4, in operation 410, a blower that supplies the air to the supply air duct installed in the interior of the building in a vertical direction may be designed based on a leakage flow rate and a supplementation flow rate of the air generated in the plurality of ancillary rooms included in the building. The leakage flow rate and the supplementation flow rate may be determined in advance depending on structures of the ancillary rooms and the doors, the number of the ancillary rooms, the number of the floors of the building, and related rules. The blower may be designed in consideration of a flow rate, a static pressure, a variable pressure, a total pressure of the air by the blower, and the like.

In operation 420, the flow rate of the air generated by the blower may be measured. At a rated operation point of the blower, the flow rate, the static pressure, the variable pressure, the total pressure of the air by the blower, and the like may be tested.

In operation 430, opening areas of the plurality of openings may be calculated such that the opening areas increase as locations of the plurality of openings become farther away from a point, at which the air is supplied to the supply air duct by the blower, based on a flow rate of the air generated by the blower, the number of the plurality of floors, pressures in the plurality of openings, and occupied areas of a plurality of automatic differential pressure dampers. Accordingly, the plurality of openings having the opening areas that are suitable for the supply air duct may be formed. The opening areas may be calculated in a scheme that is similar to the one described with reference to FIG. 3.

In operation 440, the plurality of openings may be formed in the supply air duct depending on the calculated opening areas. A construction for forming the plurality of openings may be made by delivering widths and heights of the openings corresponding to the calculated opening areas to an operator.

In operation 450, the differential pressures generated in the plurality of ancillary rooms, respectively, may be tested. The differential pressures may be measured by the automatic differential pressure dampers installed in the plurality of ancillary rooms, respectively, and it may be tested whether overpressures occur in the plurality of ancillary rooms, respectively. Together with the test for the differential pressures, a test for smoke-proof wind speeds may be performed.

In operation 460, the opening areas of the plurality of openings may be adjusted based on the test result. According to the test result, the opening areas may increase or decrease. When an overpressure occurs in a specific ancillary room, the opening area of the opening communicated with the specific ancillary room may decrease, and when the differential pressure is low, the opening area of the opening communicated with the specific ancillary room may increase.

Figure 5:
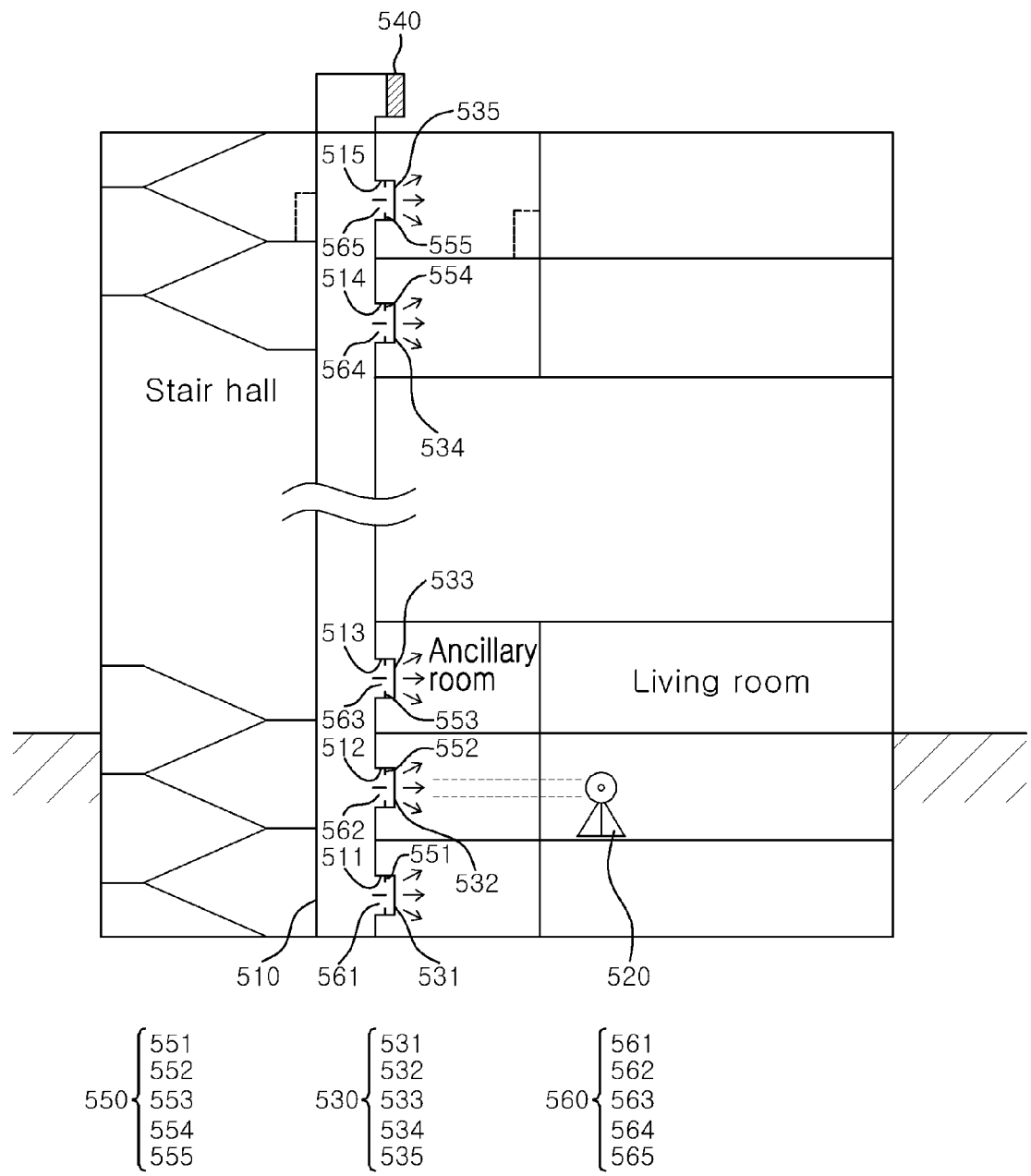
FIG. 5 is an elevation view of a building illustrating a whole structure of a smoke control system of a building according to an embodiment.

FIG. 5 is an elevation view of a building illustrating a whole structure of a smoke control system of the building according to an embodiment.

Referring to FIG. 5, a smoke control system 500 of a building according to an embodiment may be installed in an interior of the building. The building is a building having a plurality of floors each including a stair hall, an ancillary room (or an evacuation zone), and a living room (an interior space connected to the ancillary room), and for example, may be an apartment house. The smoke control system 500 of the building may include a supply air duct 510, a blower 520, a plurality of automatic differential pressure dampers 530, a system flap damper 540, and a plurality of opening area adjusting members 550.

The supply air duct 510 may be installed in an interior of the building having the plurality of floors in a vertical direction. The supply air duct 510 may be a conduit, in which air is communicated. The supply air duct 510 may be located to be adjacent to ancillary rooms provided in the floors of the building, respectively. The supply air duct 510 may include a plurality of communication passages 511, 512, 523, 524, and 515 corresponding to the plurality of floors of the building, respectively. The plurality of communication passages 511, 512, 523, 524, and 515 may extend toward the plurality of ancillary rooms provided in the plurality of floors, respectively. The plurality of communication passages 511, 512, 523, 524, and 515 may be communicated with the plurality of ancillary rooms through the plurality of automatic differential pressure dampers 530, respectively. For example, the fifth communication passage 515 may be located to be adjacent to the ancillary room on the uppermost floor, and may be communicated through a fifth automatic differential pressure damper 535. One end of the supply air duct 510 may be exposed to an outside of the building.

The blower 520 may supply air to the supply air duct 510. The blower 520, for example, may be installed on the first basement floor of the building as illustrated in FIG. 5, and may be installed on another floor if necessary. It may be designed such that a flow rate of the air supplied to the supply air duct 510 by the blower 520 corresponds to a sum of a leakage flow rate and a supplementation flow rate of the air in the ancillary room. The leakage flow rate may mean a flow rate of the air leaked from all of the ancillary room in a state, in which doors of a living room and a stair hall are closed. The supplementation flow rate may mean a flow rate of the air leaked when the door of the living room is opened (the number of opened doors is set differently depending on the number of the floors of the building). Differential pressures in the ancillary rooms and the living rooms may be maintained by the air supplied by the blower 520.

The plurality of automatic differential pressure dampers 530 may be installed in the plurality of ancillary rooms, respectively, to be adjacent to the plurality of communication passages 511, 512, 523, 524, and 515. Each of the automatic differential pressure dampers 530 may include a sleeve, a louver, a damper, a motor, a differential pressure sensor, and a control panel. The automatic differential pressure damper 530 may supply the air supplied through the plurality of communication passages 511, 512, 523, 524, and 515 to the ancillary room by opening and closing the damper depending on a differential pressure detected by the differential pressure sensor.

The system flap damper 540 may be installed at one end of the supply air duct 510. The system flap damper 540 may be operated in a gravitational way by an internal pressure of the supply air duct 510. The system flap damper 540 may be closed immediately when the door of the living room or the door of the stair hall is opened, and thus the air of the supplementation flow rate may be supplied to the ancillary room. The system flap damper 540 may prevent generation of an overpressure by discharging the air of the supplementation flow rate and the air of a marginal leakage flow rate when both of the door of the living room and the door of the stair hall are closed, and surging may be prevented due to a rated operation of the blower 520.

The plurality of opening area adjusting members 550 may be located between the plurality of communication passages 511, 512, 523, 524, and 515 and the plurality of automatic differential pressure dampers 530, respectively. For example, a fifth opening area adjusting member 555 may be located between the fifth communication passage 515 and the fifth automatic differential pressure damper 535. The plurality of opening area adjusting members 550 may be formed to have a plate shape including the openings 560. The plurality of opening area adjusting members 550 may be formed integrally with the plurality of automatic differential pressure dampers 530. For example, a fourth opening area adjusting member 554 may be coupled to a rear surface of a fourth automatic differential pressure damper 534. A coupling form of the opening area adjusting members 550 and the automatic differential pressure dampers 530 will be described in detail with reference to FIG. 6.

The opening areas of the plurality of openings 560 formed in the plurality of opening area adjusting members 550 may be different. For example, the opening areas of the plurality of openings 560 may increase as the locations of the plurality of openings 560 become farther away from a point, at which the air is supplied to the supply air duct 510 by the blower 520. The opening areas of the plurality of openings 560 may be formed to generate uniform differential pressures in the plurality of ancillary rooms by uniformly distributing flow rates of the air in the plurality of openings 560. Pressures (e.g., static pressures) in the plurality of openings 560 may decrease as the openings 560 become farther away from the blower 520, and accordingly, flow velocities of the air in the plurality of openings 560 may decrease as the openings 560 become farther away from the blower 520. For example, the opening areas of the first opening 561 and the third opening 563 may be larger than the opening area of the second opening 562, the opening area of the fourth opening 564 may be larger than the opening area of the third opening 563, and the opening area of the fifth opening 565 may be larger than the opening area of the fourth opening 564. As the opening areas become larger as the openings 560 become farther away from the blower 520, the flow rates of the air may be distributed uniformly.

According to an embodiment, the opening areas of the plurality of openings 560 may be determined based on the flow rates of the air generated by the blower 520, the number of the plurality of floors, and the pressures in the plurality of communication passages 511, 512, 523, 524, and 515. Maximum values of the opening areas of the plurality of openings 560 may correspond to occupied areas of the plurality of automatic differential pressure dampers 530. A detailed method for determining the opening areas is similar to the one described with reference to FIG. 3.

Figure 6:
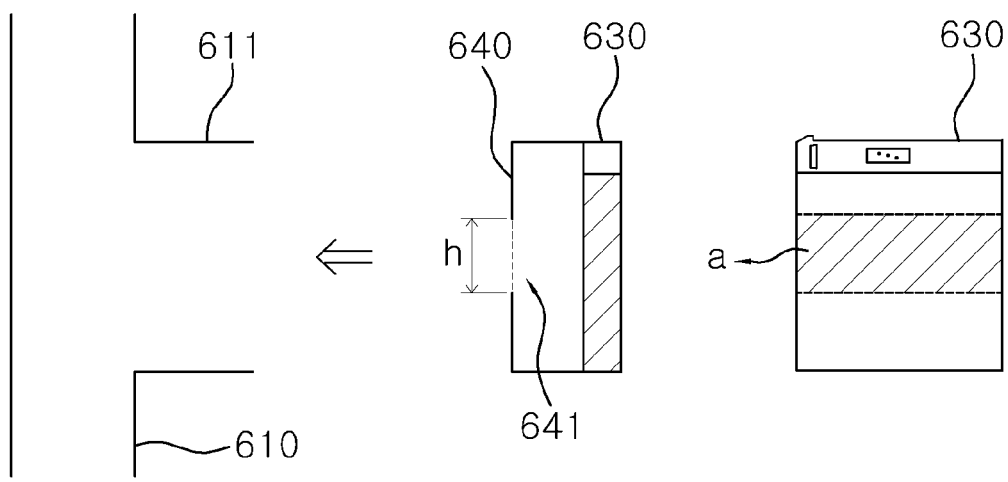
FIG. 6 illustrates a supply air duct included in a smoke control system of a building, opening area adjusting members, and automatic differential pressure dampers according to an embodiment.

FIG. 6 illustrates a supply air duct included in a smoke control system of a building, opening area adjusting members, and automatic differential pressure dampers according to an embodiment.

Referring to FIG. 6, the smoke control system according to an embodiment may include a supply air duct 610, a communication passage 611, an automatic differential pressure damper 630, and an opening area adjusting member 640.

The air supplied by the blower may be supplied to the supply air duct 610. The air supplied to the supply air duct 610 may be supplied to the ancillary room through the communication passage 611, the opening area adjusting member 640, and the automatic differential pressure damper 630 to maintain differential pressures. The opening area adjusting member 640 may be coupled to a rear surface of the automatic differential pressure damper 630. The opening area adjusting member 640 may be formed integrally with the automatic differential pressure damper 630. The opening area adjusting member 640 and the automatic differential pressure damper 630 may be coupled to the communication passage 611. Flow velocities of the air that passes through the communication passage 611 may be different depending on the floors, on which the communication passage 611 are located. A constant flow rate may be generated by adjusting a height "h" of the opening 641 formed in the opening area adjusting member 640 depending on a pressure (e.g., a static pressure) in the communication passage 611 (a width of the opening 641 may be fixed). The automatic differential pressure damper 630 may detect a differential pressure of the ancillary room and a living room, and may supply the air supplied through the communication passage 611 to the ancillary room by opening the damper when the differential pressure is lower than a target value (e.g., 40 Pa), and may cut off supply of the air to the ancillary room by closing the damper when the differential pressure is higher than a target value (e.g., 60 Pa). The opening area "a" of the opening 641 may be not more than an area of the automatic differential pressure damper 630.

Figure 7:
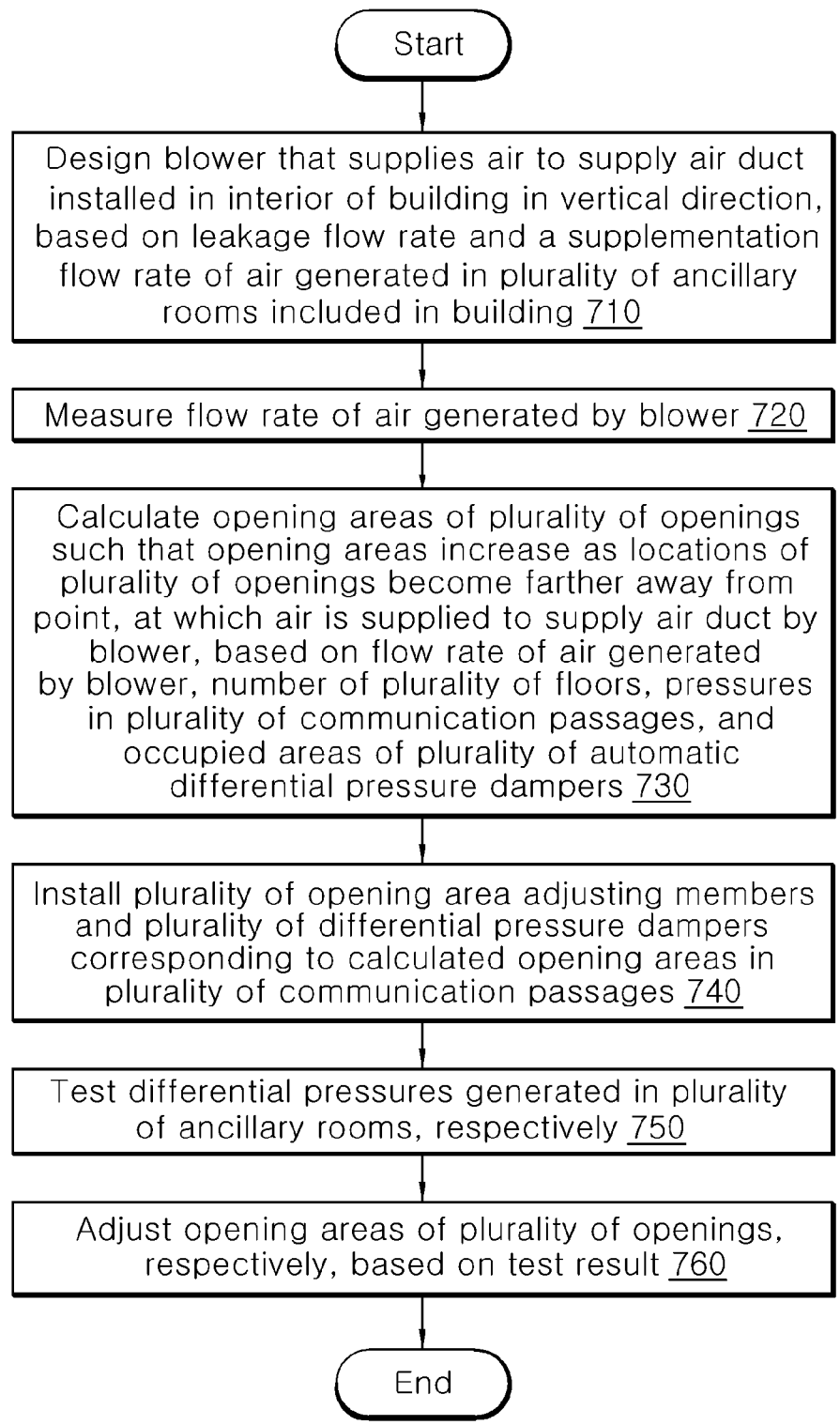
FIG. 7 is a flowchart illustrating a method for constructing a smoke control system of a building according to an embodiment.

FIG. 7 is a flowchart illustrating a method for constructing the smoke control system of a building according to an embodiment.

Referring to FIG. 7, in operation 710, a blower that supplies the air to the supply air duct installed in the interior of the building in a vertical direction may be designed based on a leakage flow rate and a supplementation flow rate of the air generated in the plurality of ancillary rooms included in the building. The leakage flow rate and the supplementation flow rate may be determined in advance depending on structures of the ancillary rooms and the doors, the number of the ancillary rooms, the number of the floors of the building, and related rules. The blower may be designed in consideration of the flow rate, the static pressure, the variable pressure, the total pressure of the air by the blower, and the like.

In operation 720, the flow rate of the air generated by the blower may be measured. At a rated operation point of the blower, the flow rate, the static pressure, the variable pressure, the total pressure of the air by the blower, and the like may be tested.

In operation 730, opening areas of the plurality of openings may be calculated such that the opening areas increase as locations of the plurality of openings become farther away from a point, at which the air is supplied to the supply air duct by the blower, based on a flow rate of the air generated by the blower, the number of the plurality of floors, pressures in the plurality of communication passages, and occupied areas of a plurality of automatic differential pressure dampers. The opening areas of the plurality of openings formed in the plurality of opening area adjusting members, respectively, located between the plurality of communication passage included in the supply air duct and the plurality of automatic differential pressure dampers installed to be adjacent to the plurality of communication passage, respectively, may be determined. The opening areas may be calculated in a scheme that is similar to those described with reference to FIGS. 3 and 6.

In operation 740, the plurality of opening area adjusting member and the plurality of automatic differential pressure dampers corresponding to the calculated opening areas may be installed in the plurality of communication passages, respectively. A construction for delivering widths and heights corresponding to the calculated opening areas to the operator, selecting the opening area adjusting members having the corresponding opening areas and the automatic differential pressure dampers, and coupling them to the communication passages may be made.

In operation 750, the differential pressures generated in the plurality of ancillary rooms, respectively, may be tested. The differential pressures may be measured by the automatic differential pressure dampers installed in the plurality of ancillary rooms, respectively, and it may be tested whether overpressures occur in the plurality of ancillary rooms, respectively. Together with the test for the differential pressures, a test for smoke-proof wind speeds may be performed.

In operation 760, the opening areas of the plurality of openings may be adjusted based on the test result. According to the test result, the opening areas may increase or decrease. When an overpressure occurs in a specific ancillary room, the opening area of the opening communicated with the specific ancillary room may decrease, and when the differential pressure is low, the opening area of the opening communicated with the specific ancillary room may increase.

The embodiments of the inventive concept may provide a smoke control system, in which the opening areas of the openings on the respective floors, which are formed in the supply air duct or the opening area adjusting members, are formed to increase as the floors become higher, whereby uniform amounts of air is supplied to the floors through the supply air duct. Accordingly, the differential pressures between the ancillary rooms and the living rooms may be uniformly formed for all the floors in the building, and overpressures of some floors may be prevented.

In addition, an overpressure and a low pressure that may be generated as the doors are opened and closed on the respective floors of the building by installing the gravitational system flap damper at distal ends of the supply air duct may be prevented, and surging may be prevented through a rated operation of the blower.

In addition, the inventive concept may provide various effects that are directly or indirectly recognized.

The above description is a simple exemplification of the technical spirits of the inventive concept, and the inventive concept may be variously corrected and modified by those skilled in the art to which the inventive concept pertains without departing from the essential features of the inventive concept. Accordingly, the embodiments disclosed in the inventive concept is not provided to limit the technical spirits of the inventive concept but provided to describe the inventive concept, and the scope of the technical spirits of the inventive concept is not limited by the embodiments. Accordingly, the genuine technical scope of the inventive concept should be construed by the attached claims, and all the technical spirits within the equivalent ranges fall within the scope of the inventive concept.

What is claimed is:

1. A smoke control system of a building comprising:
    a supply air duct installed in an interior of the building having a plurality of floors in a vertical direction, including a plurality of openings corresponding to the plurality of floors, respectively, and one end of the supply air duct is exposed to an outside of the building;
    a blower configured to supply air to the supply air duct; and
    a plurality of automatic differential pressure dampers installed in a plurality of ancillary rooms provided on the plurality of floors, respectively, to be adjacent to the plurality of openings,
    wherein opening areas of the plurality of openings increase as locations of the plurality of openings become farther away from a point, at which air is supplied to the supply air duct by the blower,
    wherein the opening areas of the plurality of openings are determined based on a flow rate of the air generated by the blower, a number of the plurality of floors, and pressures in the plurality of openings, and
    wherein maximum values of the opening areas of the plurality of openings correspond to occupied areas of the plurality of automatic differential pressure dampers.

2. The smoke control system of claim 1, further comprising:
    a gravitational system flap damper installed at the one end of the supply air duct, and operated by an internal pressure of the supply air duct.

3. The smoke control system of claim 2, wherein the opening areas of the plurality of openings are determined to generate uniform differential pressures in the plurality of ancillary rooms by uniformly distributing flow rates of the air in the plurality of openings.

4. A method for constructing a smoke control system of a building, the method comprising:
    designing a blower configured to supply air to a supply air duct installed in an interior of the building having a plurality of floors in a vertical direction, based on a leakage flow rate and a supplementation flow rate of air generated in a plurality of ancillary rooms included in the building;
    measuring a flow rate of the air generated by the blower;
    calculating, to form a plurality of openings corresponding to the plurality of floors in the supply air duct, opening areas of the plurality of openings such that the opening areas increase as locations of the plurality of openings become farther away from a point, at which the air is supplied to the supply air duct by the blower, based on the flow rate of the air generated by the blower, a number of plurality of floors, pressures in the plurality of openings, and occupied areas of a plurality of automatic differential pressure dampers installed to be adjacent to the plurality of openings, respectively;
    forming the plurality of openings in the supply air duct depending on the calculated opening areas;
    testing differential pressures generated in the plurality of ancillary rooms, respectively; and
    adjusting the opening areas of the plurality of openings based on a result of the testing.

5. A smoke control system of a building comprising:
a supply air duct installed in an interior of the building having a plurality of floors in a vertical direction, including a plurality of communication passages corresponding to the plurality of floors, respectively, and one end of the supply air duct is exposed to an outside of the building;
a blower configured to supply air to the supply air duct;
a plurality of automatic differential pressure dampers installed to be adjacent to the plurality of communication passages, respectively, in a plurality of ancillary rooms provided in the plurality of floors, respectively; and
a plurality of opening area adjusting members located between the plurality of communication passages and the plurality of automatic differential pressure dampers, and each having a plate shape including an opening,
wherein opening areas of a plurality of openings included in the plurality of opening area adjusting members, respectively, increase as locations of the plurality of openings become farther away from a point, at which air is supplied to the supply air duct by the blower,
wherein the opening areas of the plurality of openings are determined based on a flow rate of the air generated by the blower, a number of the plurality of floors, and pressures in the plurality of communication passages, and
wherein maximum values of the opening areas of the plurality of openings correspond to occupied areas of the plurality of automatic differential pressure dampers.

\* \* \* \* \*